United States Patent [19]

Montgomery, Sr.

[11] Patent Number: 4,970,371

[45] Date of Patent: Nov. 13, 1990

[54] APPARTUS AND METHOD FOR TWISTING WELD WIRE

[75] Inventor: Daniel C. Montgomery, Sr., McBee, S.C.

[73] Assignee: A. O.D. Smith Corporation, Milwaukee, Wis.

[21] Appl. No.: 463,246

[22] Filed: Jan. 10, 1990

[51] Int. Cl.$^5$ ............................................. B23K 9/133
[52] U.S. Cl. ................................ 219/137 R; 140/149; 219/136; 219/137.8
[58] Field of Search .......... 219/136, 137 R, 137 WM, 219/137.2, 137.8, 145.32; 140/149

[56] References Cited

U.S. PATENT DOCUMENTS

| | | | |
|---|---|---|---|
| 2,435,800 | 2/1948 | Sawhill et al. | 219/145.32 |
| 2,824,213 | 2/1958 | Shearer, Jr. et al. | |
| 2,914,643 | 11/1989 | Fields et al. | |
| 2,964,612 | 12/1960 | Savard et al. | 219/137 WM |
| 3,163,187 | 12/1964 | MacIntosh | 140/149 |
| 4,386,259 | 5/1983 | Nagai et al. | |

Primary Examiner—Clifford C. Shaw
Attorney, Agent, or Firm—Andrus, Sceales, Starke & Sawall

[57] ABSTRACT

An apparatus and method for on-line pretwisting of welding wire. A spindle member is rotatably mounted within a housing, which includes an inlet for receiving two or more strands of welding wire. A wire advancing mechanism is provided within a cavity formed in the spindle member immediately downstream of the housing inlet, for advancing the strands of wire through the spindle member and the housing. The spindle member is rotatable about a twisting axis relative to the housing. Upon simultaneous operation of the advancing mechanism and rotation of the spindle member, twisting is imparted to the wire strands. The advancing mechanism feeds the twisted wire strands through a guide tube, which has its outlet positioned immediately upstream of a welding head. The twisted welding wire is fed through the guide tube outlet into the welding head for use in a welding operation.

16 Claims, 4 Drawing Sheets

APPARTUS AND METHOD FOR TWISTING WELD WIRE

BACKGROUND AND SUMMARY

This invention relates to welding, and more particularly to an apparatus and method for twisting two or more strands of welding wire prior to use thereof in a welding operation.

In a welding application, it is known to use a consumable electrode made of a plurality of intertwisted wire strands, such as is disclosed in U.S. Pat. No. 4,386,259 to Nagai, et al. This patent, along with other known processes, involves use of a multiple strand electrode which is intertwisted off-line. The twisted electrode or wire allows a wider weld bead than would otherwise be possible with a single-strand electrode or wire.

The present invention provides an apparatus and method for in-line twisting of strands of welding wire, immediately upstream of the welding torch head which performs the welding operation. In accordance with the invention, a welding wire feeder for positioning upstream of a welding torch head includes a housing having an inlet for receiving the strands of wire, and advancing means for advancing the wire through the housing. Twisting means is associated with the housing downstream of the inlet and upstream of the head for imparting twisting to two or more strands of wire as they are advanced through the housing, thereby providing a twisted multi-strand element for use in welding. In a preferred embodiment, the advancing means is provided on a rotatable member mounted to the housing, and the twisting means causes rotation of the rotatable member about a longitudinal twisting axis substantially parallel to the direction of advancement of the wire through the housing. The rotatable element preferably comprises a spindle member having an interior cavity formed at one end thereof, with the cavity being in communication with the housing inlet and the advancing means disposed within the spindle cavity. In this manner, upon simultaneous operation of the advancing means and rotation of the spindle member, twisting is imparted to the strands of wire due to rotation of the advancing means about the twisting axis. The advancing means preferably comprises a pair of wire feed rollers rotatably mounted within the spindle member cavity. Drive means is provided for imparting rotation to the wire feed rollers. The drive means preferably comprises a rotatable inner gear located in the spindle member cavity, and drivingly engaged with one of the wire feed rollers. An outer gear located on the exterior of the spindle member is drivingly connected to the inner gear. A drive gear assembly is rotatably mounted to the exterior of a portion of the spindle member downstream of the cavity, at least a portion of which is engageable with the outer gear. In one embodiment, the drive gear assembly is interconnected to a drive motor through a worm wheel and worm gear arrangement, for rotating the drive gear assembly about the spindle member. Such rotation of the drive gear assembly causes rotation of the outer gear, which imparts rotation to the inner gear and thereby drives the wire feed rollers. A twisting motor is preferably connected to the housing, and is interconnected with the spindle member through a pulley and timing belt arrangement. In this manner, upon selective actuation of the twisting motor, the spindle member is rotated about the twisting axis for imparting rotation to the wire feed rollers. A passage is formed in the spindle member downstream of the cavity for receiving the twisted wire, and includes an outlet for feeding the twisted wire to the welding torch head.

The invention also contemplates a method of twisting welding wire, substantially in accordance with the foregoing description.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
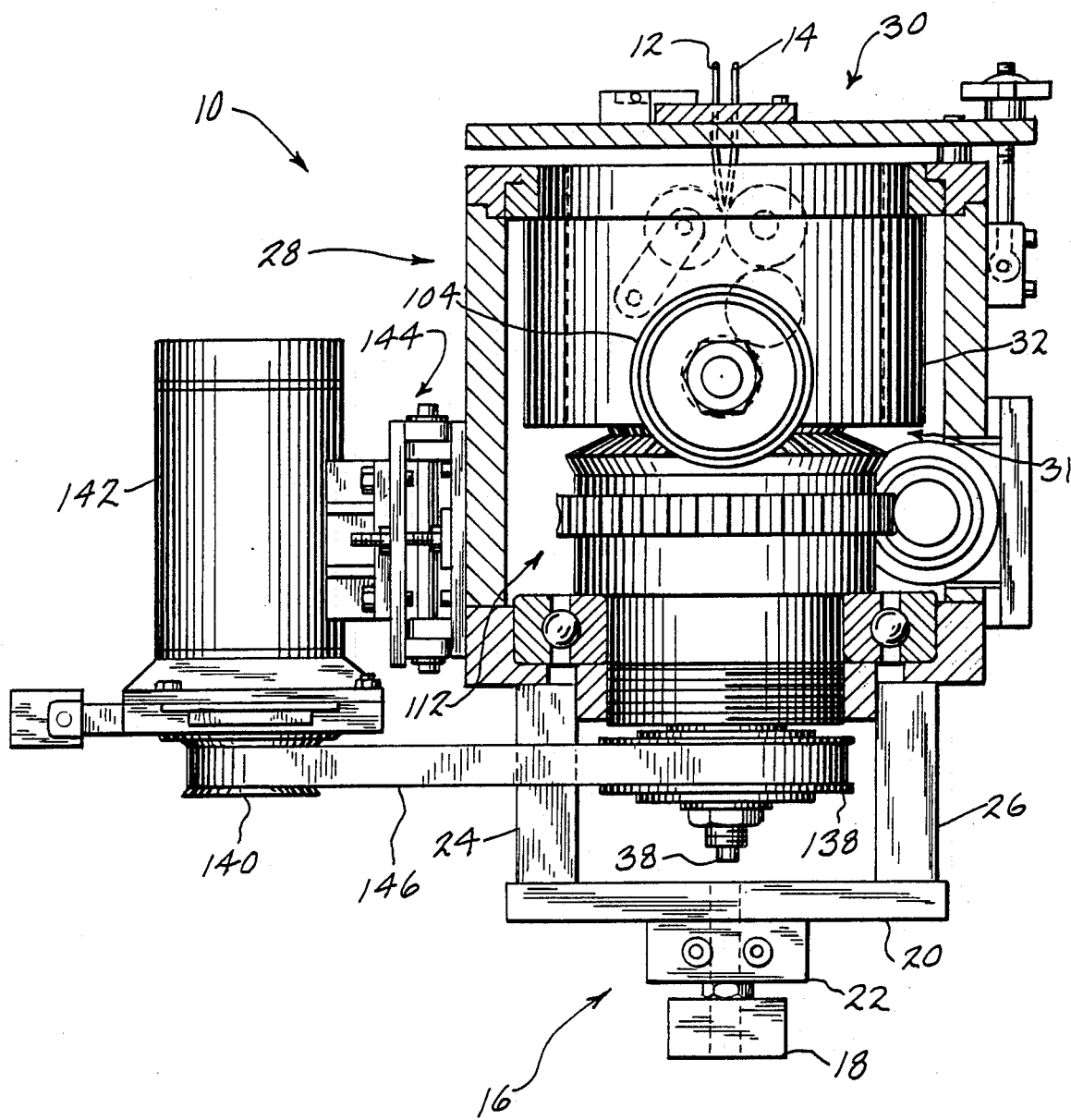
FIG. 1 is an elevation view, partially in section, showing the welding wire twisting apparatus of the invention.

With reference to FIG. 1, a wire feeding apparatus 10 is adapted for interposition between a pair of wire supply rolls (not shown), which supply a pair of welding wires 12, 14, and a welding apparatus 16. Welding apparatus 16 includes a torch head 18 connected to a torch mounting plate 20 by means of an adapter 22. A plurality of stand-off members, two of which are shown at 24, 26, extend between torch mounting plate 20 and wire feeding apparatus 10, for connecting welding apparatus 16 thereto. As is known, torch head 18 operates to consume welding wire passing therethrough for welding two pieces of material together, such as in a MIG welding application.

Figure 3:
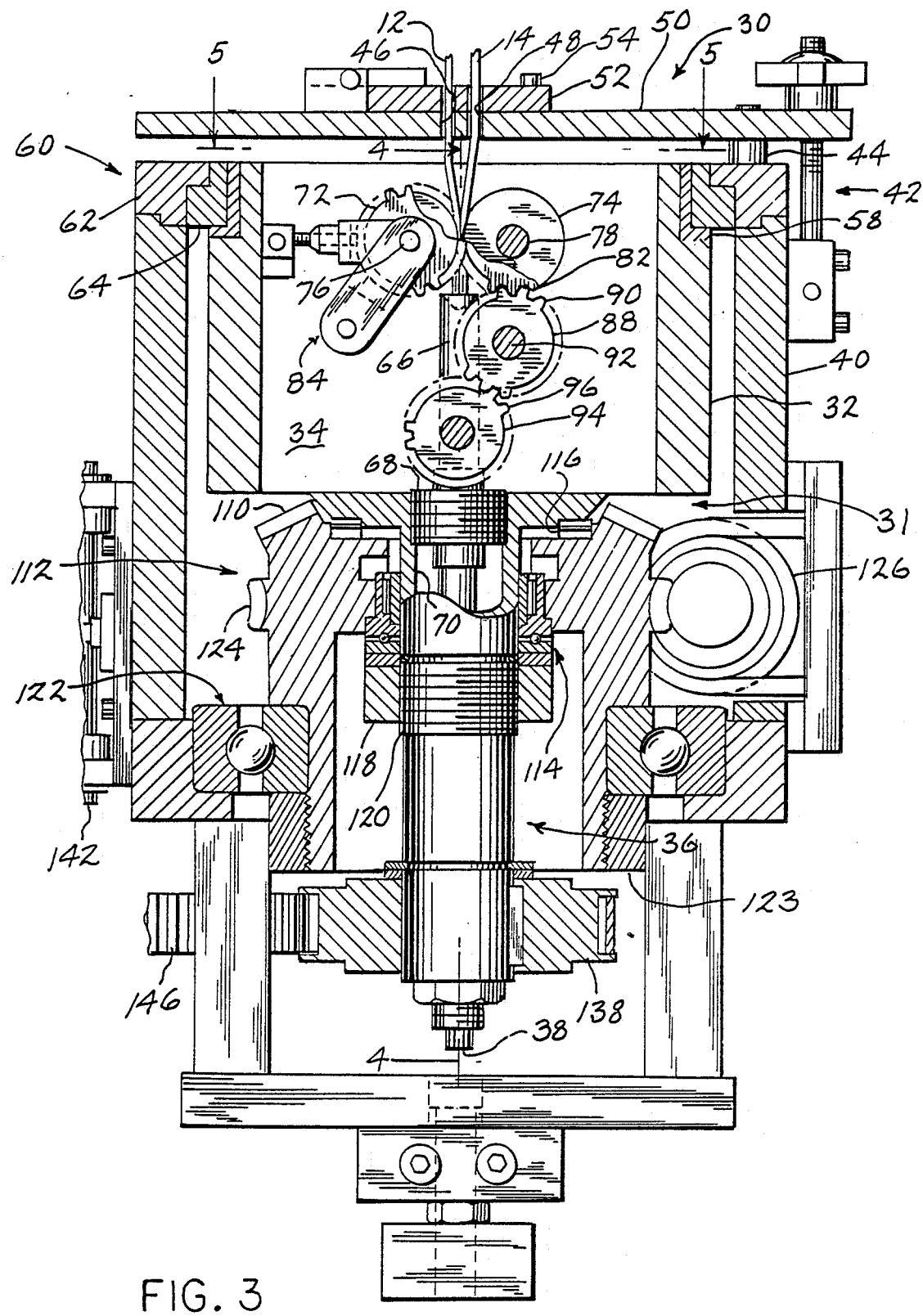
FIG. 3 is an enlarged longitudinal sectional view, showing the internal components of the apparatus of FIGS. 1 and 2.

Wire feeding apparatus 10 broadly includes a housing assembly 28, a cover member 30, and spindle member 31 mounted in the interior of housing assembly 28. With reference to FIG. 3, spindle member 31 generally includes an enlarged upstream portion 32 including an internal cavity 34, and a reduced diameter downstream portion 36. Spindle downstream portion 36 has an outlet 38 disposed closely adjacent the upstream side of torch mounting plate 20.

Referring still to FIG. 3, cover assembly 30 is adapted for connection to the side wall 40 of housing assembly 28 by means of a plurality of eye-bolt assemblies, one of which is shown at 42, connected to housing side wall 40. A series of spacers, one of which is shown at 44, act to space cover assembly 30 above the upper surface of housing assembly 28.

A pair of passages 46, 48 are formed in cover plate 50, and accommodate passage of wire strands 12, 14 therethrough into the interior of housing assembly 28. A bushing plate 52 is connected to cover plate 50 by means of a series of screws, such as shown at 54, provided in a series of slots 56 (FIG. 2), for providing variable positioning of bushing plate 52 on cover plate 50.

Spindle member 31 is mounted in the interior of housing assembly 28 such that cavity 34 provided in spindle member enlarged portion 32 is located immediately adjacent and downstream of the underside of cover plate 50. Cavity 34 is in communication with passages 46, 48 formed in cover plate 50, so that wires 12, 14 fed therethrough are received within cavity 34. At its upper end, spindle member enlarged portion 32 is provided with an L-shaped ring bearing member 58 fitted within a groove formed about its outer periphery.

At its upper end, housing side wall 40 is provided with a cap assembly 60, which includes a top cap member 62 and an oilite bearing member 64. As shown, oilite bearing member 64 is disposed between the outer surface of L-shaped ring member 58 and cap member 62.

A guide tube 66 is positioned within spindle member 31 such that its inlet is disposed within spindle member cavity 34, and is substantially in line with the direction of advancement of wire strands 12, 14 through passages 46, 48 in cover plate 50. Guide tube 66 is connected to spindle member 31 by engagement of an externally threaded portion 68 with internal threads provided at the upper end of an internal passage 70 formed in spindle member downstream portion 36. Guide tube 66 extends through passage 70, and is in communication with outlet 38.

Figure 4:
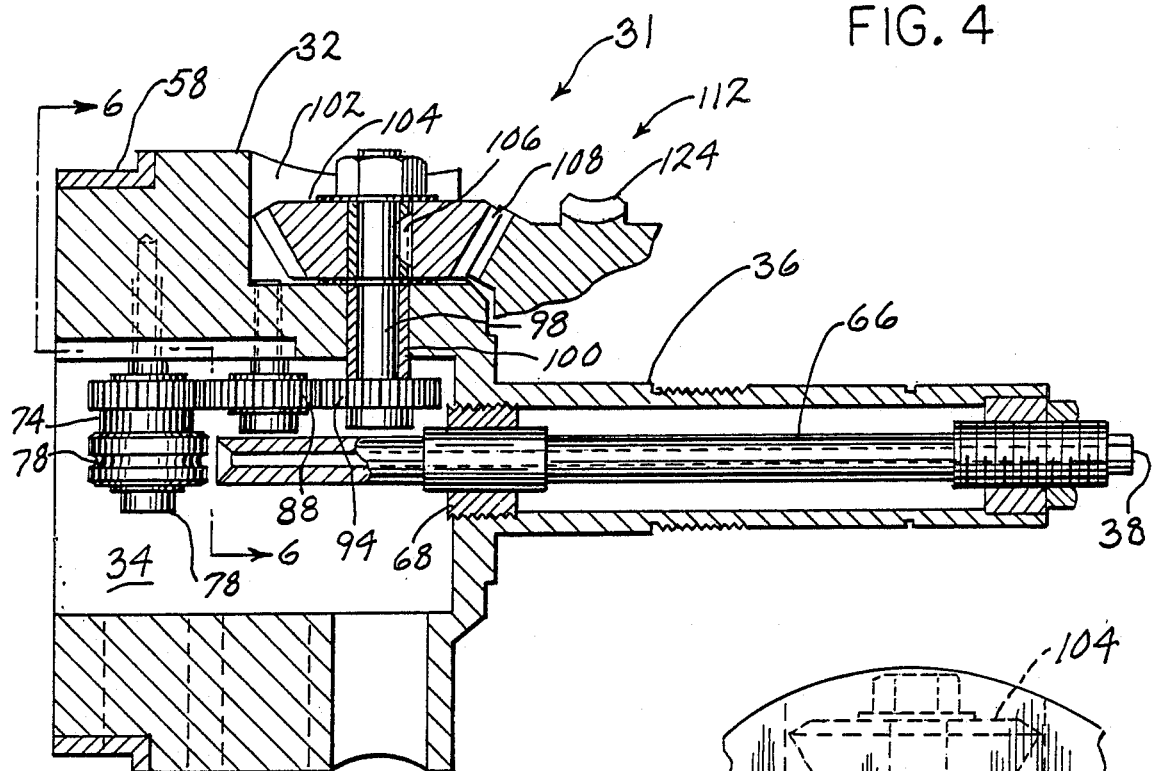
FIG. 4 is a partial sectional view taken generally along line 4—4 of FIG. 3.
Figure 6:
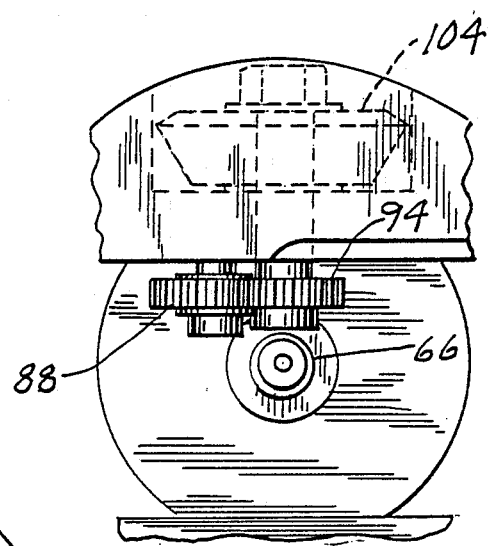
FIG. 6 is a partial sectional view taken generally along line 6—6 of FIG. 4.
Figure 5:
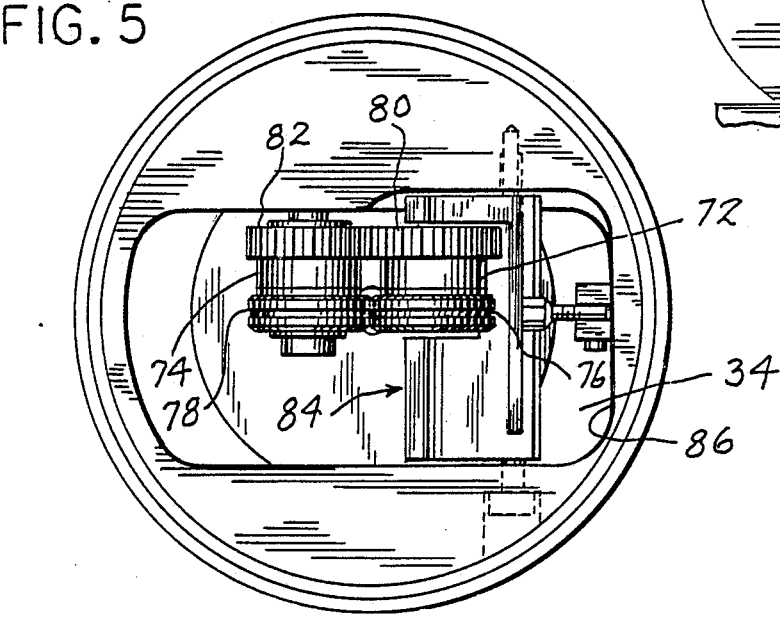
FIG. 5 is a partial top plan view, with reference being made to line 5—5 of FIG. 3.

As a means for advancing wire strands 12, 14 through spindle member 31 and housing assembly 28, a pair of wire feed rollers 72, 74 are rotatably mounted by means of a pair of pins 76, 78, respectively, within spindle member cavity 34. With reference to FIGS. 4 and 5, wire feed rollers 72, 74 are provided with a pair of circumferential grooves 76, 78, respectively, which receive wire strands 12, 14 therein. Wire feed rollers 72, 74 further include circumferentially toothed portions 80, 82, respectively, which are engaged with each other. Pin 76, to which roller 72 is rotatably mounted, is connected at its ends to a rocker assembly 84, which is disposed between roller 72 and the inner side wall of spindle enlarged portion 32, shown at 86. Rocker assembly 84 is adjustable so that the position of wire feed roller 72 relative to roller 74 can be adjusted, accommodating varying widths of wire strands 12, 14 therebetween.

Referring to FIG. 3, an idler gear 88 is disposed adjacent wire feed roller 74, and includes a circumferential series of teeth 90 engaged with toothed portion 82 of roller 74. Idler gear 88 is rotatably mounted within spindle member cavity 34 by means of a pin 92.

An inner drive gear 94 is mounted within spindle member cavity 32, and includes a series of circumferential teeth 96 which engage teeth 90 provided on idler gear 88. With reference to FIG. 4, inner drive gear 94 is fixedly mounted to a jack shaft 98 mounted within a spacer 100. Jack shaft 98 and spacer 100 extend through the side wall of spindle member enlarged portion 32 and project outwardly into a recess 102 formed in enlarged portion 32. An outer bevel gear 104 is disposed within recess 102, and is fixed to jack shaft 98 by means of a key 106. Outer bevel gear 104 includes a series of circumferential teeth 108, which are drivingly engaged by a circumferential series of bevel gear teeth 110 provided on a drive gear assembly 112.

Referring again to FIG. 3, drive gear assembly 112 is mounted to the exterior of spindle member downstream portion 36. A bearing assembly 114 is disposed between the interior of drive gear assembly 112 and the exterior of spindle member downstream portion 36, for providing free rotation of drive gear assembly 112 thereabout. A thrust bearing 116 is disposed between the upper face of drive gear assembly 112 and the lower face of spindle member enlarged portion 32. A nut 118 is threadedly engaged with a series of external threads 120 formed on spindle member downstream portion 36, for securely and rotatably affixing drive gear assembly 112 to spindle member downstream portion 36.

The spindle member and drive gear assembly combination is rotatably mounted within the interior of housing assembly 28. Spindle member 31 is rotatably supported at its upper end by oilite bearing member 64, and drive gear assembly 112 is supported at the lower end of housing assembly 128 by means of a bearing assembly 122. A Spieth nut 123 serves to secure the inner race of bearing assembly 122 to drive gear assembly 112.

Figure 2:
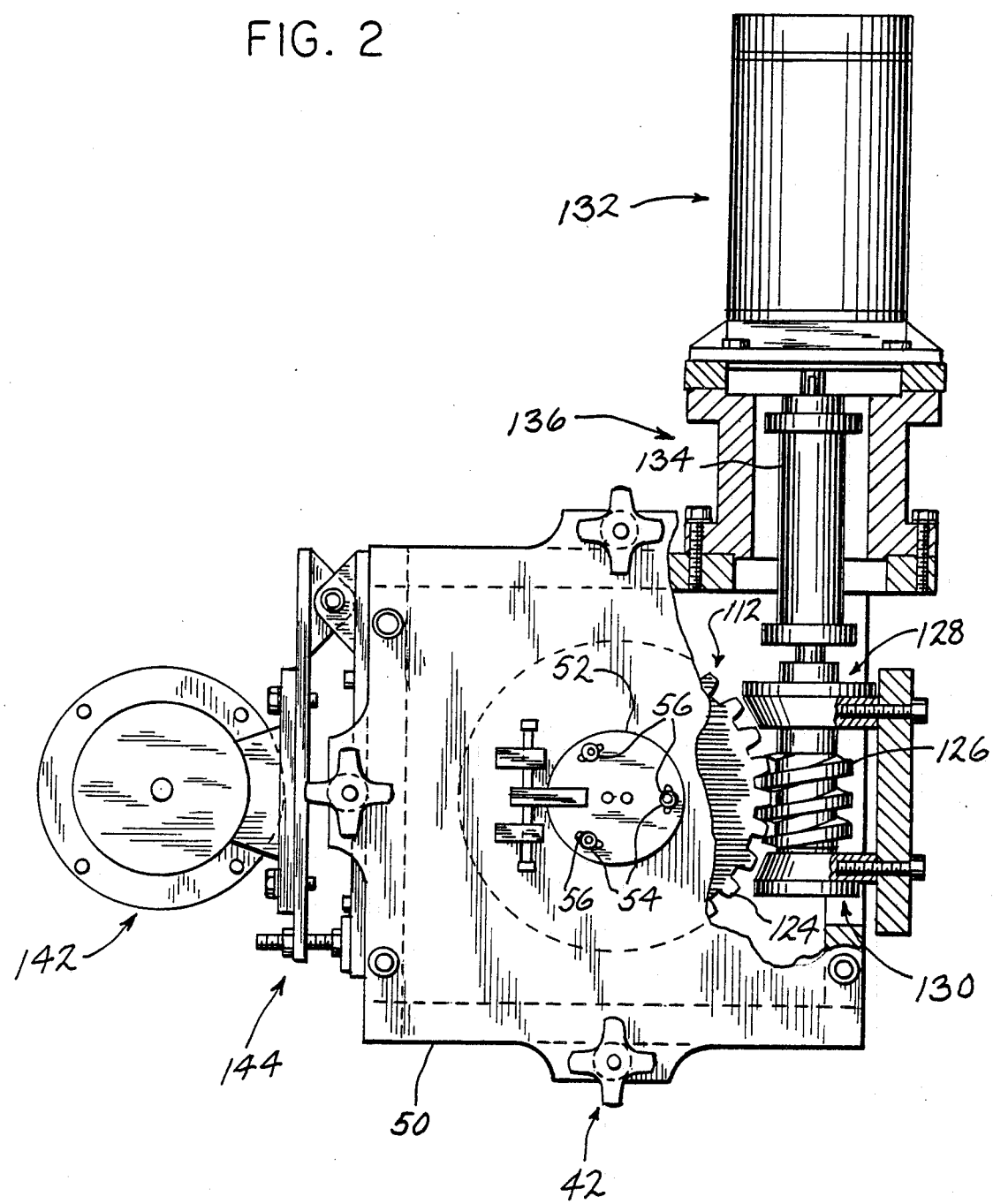
FIG. 2 is a top plan view, with portions broken away, showing the apparatus of FIG. 1.

Drive gear assembly 112 includes a worm wheel 124 providing a series of outwardly facing spaced teeth, which are engageable with a worm gear 126. With reference to FIG. 2, worm gear 126 is rotatably mounted between a pair of bearing assemblies 128, 130 to housing assembly 28. A motor 132, including an output shaft 134, is mounted to housing assembly 28 by means of a motor mount 136. Output shaft 134 is drivingly connected to worm gear 126. In this manner, operation of motor 132 results in rotation of worm gear 126.

With reference to FIGS. 1 and 3, a pulley 138 is fixed to the lower end of spindle member downstream portion 36. A pulley 140 is affixed to the output shaft of a motor 142 fixed to housing assembly 28 by means of a motor mount assembly 144, and a timing belt 146 is trained around pulleys 138, 140.

In operation, wire feeding apparatus 10 as described functions as follows.

In order to advance wire strands 12, 14 through spindle member 31, drive motor 132 is actuated so as to impart rotation to worm gear 126. Such rotation of worm gear 126 causes rotation of drive gear assembly 112 through worm wheel 124, and thereby rotation of bevel gear teeth 110 provided on drive gear assembly 112. The rotation of bevel gear teeth 110 causes rotation of outer bevel gear 104, which is transferred through jack shaft 98 to inner drive gear 94. Such rotation of inner drive gear 94 is transferred through idler gear 88 to drive wire feed roller 74, and thereby to driven wire feed roller 72. This rotation of wire feed rollers 72, 74 causes welding wire strands 12, 14 to be drawn through inlet openings 46,48 in cover plte 50, and advanced through the nip of rollers 72, 74 and into the inlet of guide tube 66.

When it is desired to provide a twisted welding wire strand, motor 142 is actuated. Operation of motor 142 causes pulley 140 to rotate, which rotation is transferred through timing belt 146 to pulley 138 fixed to spindle member downstream portion 36. This action causes spindle member 31 to rotate relative to housing assembly 28. The above-described construction of the wire advancing system allows spindle member 31 to be rotated simultaneously with operation of the advancing mechanism. That is, rotation imparted to spindle member enlarged portion 32 causes rotation of wire feed rollers 72, 74 while they are acting to advance wire strands 12, 14. Cover plate 50 acts to maintain the position of wire strands 12, 14 during rotation of spindle member 31, thereby causing twisting of wires 12, 14 as they exit passages 46, 48 formed in cover plate 50 and enter cavity 34 formed in spindle member enlarged portion 32.

It is to be appreciated that either a right-hand or left-hand twist can be imparted to the wire strands 12, 14, depending on the direction of operation of motor 142. The amount of twist imparted to the wire strands can be varied according to the speed of operation of motor 142.

It has been found that the above-described structure provides a highly efficient and effective means for twisting of welding wire on-line, eliminating the need for off-line pretwisting of the wire strands. The apparatus is capable of providing up to 200 inches of twisted weld wire per minute, which is adequate to handle most automatic welding operations.

The invention also contemplates a method of twisting welding wire strands, substantially in accordance with the foregoing description.

Various alternatives and embodiments are contemplated as being within the scope of the following claims particularly pointing out and distincly claiming the subject matter regarded as the invention.

I claim:

1. A welding wire feeder, comprising:
   a housing including an inlet for receiving one or more strands of wire;
   advancing means for advancing said wire strands through said housing toward an outlet; and
   twisting means associated with said housing downstream of said inlet and upstream of said outlet for imparting twisting to two or more strands of wire as said strands are advanced through said housing, thereby providing a twisted wire to said outlet.

2. The wire feeder of claim 1, wherein actuation of said twisting means causes said advancing means to rotate about a twisting axis substantially parallel to the direction cf advancement of said wire through said housing.

3. The wire feeder of claim 2, wherein said advancing means is disposed closely adjacent said housing inlet, and wherein said housing inlet comprises one or more openings for receiving said one or more strands of wire and maintaining said strands of wire in position upon rotation of said advancing means for twisting said wire.

4. The wire feeder of claim 2, wherein said advancing means comprises a pair of rotatably mounted wire feed rollers between which said one or more strands of wire are received, and drive means for imparting rotation to said rollers to advance said wire.

5. The wire feeder of claim 4, wherein said wire feed rollers are rotatably mounted within a cavity formed in a spindle member, and wherein said selectively actuable twisting means comprises means for selectively rotating said spindle member about said twisting axis for twisting said wire as it is advanced through said housing.

6. The wire feeder of claim 5, wherein the spindle member cavity within which said wire feed rollers are mounted is in communication with said housing inlet and is disposed immediately downstream thereof, and wherein said drive means includes an outer gear rotatably mounted to said spindle member and including a portion disposed exteriorly thereof driven by said drive means, and an inner gear drivingly connected to said outer gear and drivingly connected to said wire feed rollers for driving said wire feed rollers in response to said drive means.

7. The wire feeder of claim 6, wherein said drive means comprises rotatable gear means mounted to said spindle member for rotation about said twisting axis, said gear means being drivingly engaged with said outer gear, and gear drive means for imparting rotation to said gear means.

8. The wire feeder of claim 7, wherein said gear means comprises a bevel gear engaged with said outer gear and a worm wheel connected to said bevel gear, and wherein said gear drive means comprises a worm gear engaged with said worm wheel, and a drive motor including an output shaft to which said worm gear is mounted for rotating said worm gear.

9. The wire feeder of claim 8, wherein said worm wheel and bevel gear are mounted for free rotation to the exterior of said spindle member for rotation about said twisting axis.

10. The wire feeder of claim 5, wherein said housing is maintained stationary relative to said spindle member, and wherein said means for selectively rotating said spindlc member about said twisting axis comprises a motor mounted to said housing and including an output shaft, and engagement means disposed between said output shaft and said spindle member for rotating said spindle member in response to operation of said motor.

11. The wire feeder of claim 10, wherein a first pulley is mounted to said spindle member and a second pulley is mounted to said output shaft, and a timing belt is drivingly engaged with said first and second pulleys for rotating said spindle member in response to operation of said motor.

12. A welding wire feeder, comprising:
   a housing including an inlet for receiving two or more strands of wire and an outlet;
   a spindle member rotatably mounted within the interior of said housing, said spindle member extending along and being rotatable about a twisting axis, said spindle member including a cavity disposed adjacent said housing inlet for receiving said strands of wire and a passage downstream thereof leading to a wire outlet;
   advancing means disposed within said spindle cavity for receiving said strands of wire and advancing said strands of wire through said housing; and
   means for rotating said spindle member about said twisting axis relative to said housing during operation of said advancing means for imparting twisting to said two or more strands of wire.

13. The wire feeder of claim 12, further comprising a torch head disposed downstream of said passage outlet for receiving twisted wire therefrom for welding.

14. The wire feeder of claim 12, wherein said advancing means comprises a pair of wire feed rollers rotatably mounted within said spindle cavity, and drive means for driving said wire feed rollers, comprising an inner gear engaged with one of said wire feed rollers, an outer gear connected to and rotatable with said inner gear, a drive gear assembly mounted for free rotation to said spindle member and engaged with said outer gear, said drive gear assembly being rotatable about said twisting axis, and means for imparting rotation to said drive gear assembly for driving said wire feed rollers.

15. A method of twisting two or more strands of welding wire upstream of a welding head, comprising the steps of:
   providing a housing having an inlet for receiving said two or more strands of wire;
   providing a spindle member having a passage leading to an outlet;
   mounting said spindle member to said housing so as to be rotatable about a twisting axis;

advancing said wire through said housing inlet and said spindle member; and imparting rotation to said spindle member simultaneously with advancing said wire through said housing inlet for outputting twisted wire through said outlet.

16. The method of claim 15, wherein the step of advancing said wire through said inlet and said spindle member comprises forming a cavity in said spindle member upstream of said passage, said cavity being in communication with said inlet when said spindle member is mouted to said housing, and providing a pair of rotatable wire feed rollers within said cavity for receiving said wire from said inlet, said rollers rotating with said spindle member during rotation thereof for simultaneously advancing and twisting said wire.

* * * * *